Figure 1:
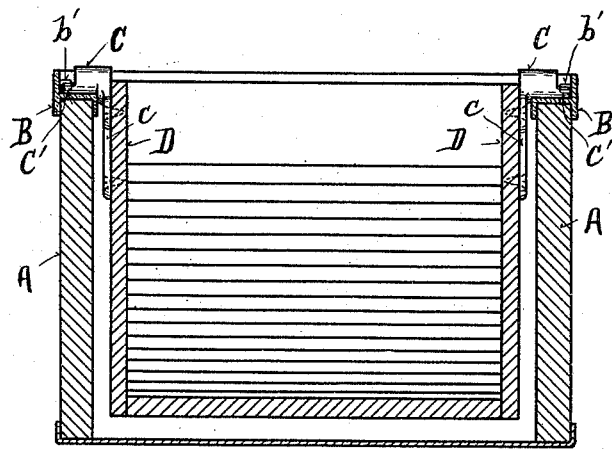

No. 689,069.  
C. DIETZ.  
BEARING AND JOURNAL.  
(Application filed Sept. 26, 1901.)  
Patented Dec. 17, 1901.

(No Model.)

Witnesses  
Wm C. Peirce  
D. Thew Wright

Inventor  
Conrad Dietz  
By James A. Ramsey  
Attorney

THE NORRIS PETERS CO., PHOTO-LITHO., WASHINGTON, D. C.

UNITED STATES PATENT OFFICE.

CONRAD DIETZ, OF CINCINNATI, OHIO.

BEARING AND JOURNAL.

SPECIFICATION forming part of Letters Patent No. 689,069, dated December 17, 1901.

Application filed September 26, 1901. Serial No. 76,630. (No model.)

*To all whom it may concern:*

Be it known that I, CONRAD DIETZ, a citizen of the United States, residing at Cincinnati, in the county of Hamilton and State of Ohio, have invented certain new and useful Improvements in Bearings and Journals, of which the following is a specification.

My invention relates to improvements in that class of journals and bearings which are separably united and which are primarily intended for use in washing-machines, but which may also be applied to other machines with great advantage.

The object of my invention is to provide simple, effective, durable, and comparatively inexpensive bearings and journals for washing-machines, which when placed in and attached to the casing and clothes-receptacles, respectively, are adapted to be so coupled together as to securely hold the receptacle in its proper operative position in the machine and to permit of its convenient and easy removal therefrom by simply tilting said receptacle slightly to either side, so as to disengage the holding parts, and then lifting the receptacle out of the casing.

My invention consists in the construction and arrangement of the bearings and journals and in the parts and combination of parts shown in the drawings and hereinafter more fully described, and pointed out in the claims.

Figure 5:
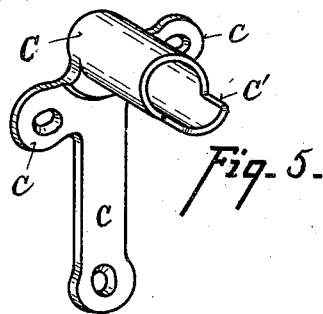
Figure 6:
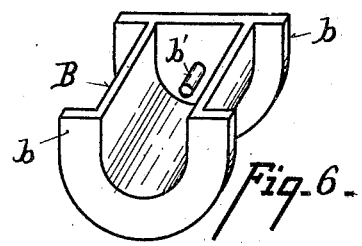
Figure 2:
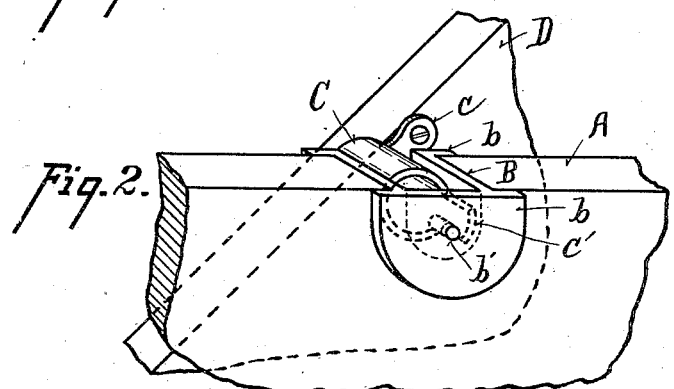
Figure 7:
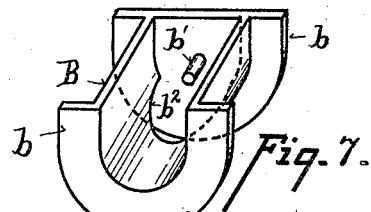
Figures 3, 4:
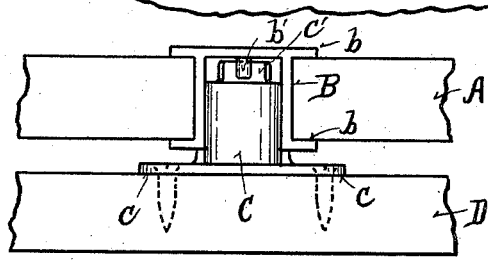

In the drawings, Figure 1 is a vertical central cross-section of a washing-machine having a clothes-receptacle pivotally mounted and retained therein by means of my improved bearings and journals. Fig. 2 is an enlarged fragmentary view of the casing and clothes-receptacle, the latter being tilted in position for insertion or removal. Fig. 3 is an enlarged detail section taken through one of the journals and its bearing, showing the position of each when the receptacle is in its operative position, as shown by Fig. 1. Fig. 4 is an enlarged detail plan view of the casing and clothes-receptacle, showing how the journal and bearing are held together. Fig. 5 is a perspective view of one of the journals. Fig. 6 is a detail of one of the bearings, and Fig. 7 is a modification thereof.

A represents the casing of a washing-machine, B the bearings, mounted in recesses in the top edges of the sides of the casing, and C the journals, mounted on the outer upper central surface of the clothes-receptacle D.

My improved bearings B are preferably constructed substantially semicylindrical in shape, having open tops and provided at each end with retaining-flanges $b$, the inner end being open and the outer end preferably closed and having a holding pin or lug $b'$ on its inner wall.

The journals C are preferably constructed of short hollow cylinders having depending straps or extensions $c$ projecting at right angles from the inner ends of the journals, by which the journals are suitably attached to the clothes-receptacle, and the outer or free end of each journal is cut away upon its upper side, so as to permit the projection $c'$ to be inserted beneath the holding-pin $b'$ on its adjacent bearing. This construction renders the making and adjustment of the parts convenient and easy and enables the user to see at a glance how the clothes-receptacle may be put into the machine or removed therefrom by simply tilting the receptacle slightly out of operative position, as shown in Fig. 2.

In the modification, Fig. 7, I have shown a bearing cut away at $b^2$ to render the construction more simple and economical by the saving of material, the opening thus formed being preferably longer than the pin $b'$. The pin $b'$ is adapted to engage the projection $c'$ at every point while the receptacle is oscillating in the casing, so as to prevent displacement thereof except when the receptacle is detached from its operative mechanism and tilted to the proper angle, as shown in Fig. 2. The operation of inserting and removing the receptacle by means of my improved bearings and journals is so obvious and simple as to require no explanation.

I claim—

1. The combination of a bearing having a lug or pin upon its outer end with a journal having a projection adapted to engage said lug or pin, said projection being of less extent than the periphery of the journal, whereby the bearing and journal may be coupled and uncoupled by lateral tilting movement of the journal relatively to said lug or pin.

2. The combination of a bearing having its outer end closed and having a holding lug or pin upon the inner wall thereof, with a journal having a projection on one side only adapted to engage said holding lug or pin.

3. The combination of bearings having their outer ends closed and a lug or pin extending inward from the outer wall of each bearing, journals attached to a receptacle and each having a projection at the outer end of the journal adapted to engage beneath said pin when the receptacle is in its operative position in the casing of the machine and said journals adapted to be released by tilting said receptacle, substantially as set forth.

CONRAD DIETZ.

Witnesses:
JAMES N. RAMSEY,
C. W. EARNIST.